(12) United States Patent
Kuo et al.

(10) Patent No.: US 7,868,784 B2
(45) Date of Patent: Jan. 11, 2011

(54) SYSTEM AND APPARATUS FOR PARKING MANAGEMENT

(75) Inventors: Lun-Chia Kuo, Hsinchu (TW);
Chung-Yi Wu, Hsinchu (TW);
Chung-Chou Shen, Xindian (TW);
Shih-I Huang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 343 days.

(21) Appl. No.: 11/944,330

(22) Filed: Nov. 21, 2007

(65) Prior Publication Data

US 2008/0165030 A1 Jul. 10, 2008

Related U.S. Application Data

(60) Provisional application No. 60/876,661, filed on Dec. 22, 2006.

(51) Int. Cl.
*G08G 1/14* (2006.01)
*B60Q 1/48* (2006.01)

(52) U.S. Cl. ............ 340/932.2; 340/928; 340/933; 340/937; 340/938; 340/988; 701/1; 701/207; 705/2; 705/5; 705/13; 455/99

(58) Field of Classification Search ............. 340/932.2, 340/988, 905, 937, 825.28, 593, 928, 933, 340/901, 904, 934, 938, 942, 5.64, 539.11, 340/539.13, 306.16; 701/207, 200; 705/13, 705/5; 455/91, 95, 99; 235/375, 378, 384; 368/6, 90
See application file for complete search history.

(56) References Cited

U.S. PATENT DOCUMENTS

| 6,147,624 | A  | * | 11/2000 | Clapper | ............ 340/932.2 |
| 6,812,857 | B1 | * | 11/2004 | Kassab et al. | .......... 340/932.2 |
| 2002/0128769 | A1 | * | 9/2002 | Der Ghazarian et al. | .... 701/207 |
| 2007/0050240 | A1 | * | 3/2007 | Belani et al. | ........... 705/13 |

FOREIGN PATENT DOCUMENTS

CN    1758299 A    4/2006

* cited by examiner

*Primary Examiner*—George A Bugg
*Assistant Examiner*—Sisay Yacob
(74) *Attorney, Agent, or Firm*—Alston & Bird LLP

(57) ABSTRACT

A system configured for parking management in a parking facility, the system comprising a plurality of parking spaces, and a plurality of sensor units corresponding to the plurality of parking spaces, each of the plurality of sensor units being configured to detect a parking status of a corresponding one of the plurality of parking spaces and transmit a first message including the parking status of the corresponding one parking space in a wireless communication network.

23 Claims, 11 Drawing Sheets

SYSTEM AND APPARATUS FOR PARKING MANAGEMENT

CROSS-REFERENCE TO RELATED APPLICATIONS

This application claims the benefit of U.S. Provisional Application No. 60/876,661, filed Dec. 22, 2006.

BACKGROUND OF THE INVENTION

The present invention relates generally to parking management and, more particularly, to a parking system and an apparatus, which may be configured to identify available parking spaces for vehicles and guide the vehicles to the available parking spaces.

Automobiles play an important and sometimes indispensable role as a means for transporting people. As a result, the number of automobiles in industrialized cities and neighboring regions continues to grow, resulting in increasing occurrences of traffic jams and rising demands for parking spaces. Locating a vacant parking space may sometimes be a time-consuming and laborious task for many drivers and motorists. Furthermore, parking lots that service shopping malls, hospitals, airports, mass transit stations, and the like often are not designed well to suit the drivers' needs. For example, electronic displays may be provided in such a parking lot for indicating the number of vacant parking spaces, which may be calculated by a sensor mounted at an entrance to the parking lot. However, the parking information or vacancy statistics provided by the electronic displays may not correctly reflect the real-time parking conditions. Moreover, users who even pay to enter the parking lot may have to search for an unoccupied parking place, and may have to self-navigate to an exit when leaving the parking place. In a large public parking facility without preassigned parking spaces, such a search may be time consuming, harmful to the environment, and often frustrating.

It may therefore be desirable to have a system capable of managing a parking facility, such as a system that is configured for monitoring parking spaces and guiding a vehicle to an available parking space. It may also be desirable to have a device capable of detecting the parking status of a parking space in a parking facility and transmitting the parking status in a wireless network.

BRIEF SUMMARY OF THE INVENTION

Examples of the present invention may provide a system configured for parking management in a parking facility, the system comprising a plurality of parking spaces, and a plurality of sensor units corresponding to the plurality of parking spaces, each of the plurality of sensor units being configured to detect a parking status of a corresponding one of the plurality of parking spaces and transmit a first message including the parking status of the corresponding one parking space in a wireless communication network.

Some example of the present invention may further provide an apparatus configured for parking management in a parking facility, the apparatus comprising a first antenna and a first communicating device corresponding to a first parking space in the parking facility. The first communicating device may further comprise a first controller configured to receive a signal related to a parking status of the first parking space, a first memory configured to store at least one of the parking status of the first parking space, a size of the first parking space, a geographical coordinate of the first parking space related to a global positioning system (GPS) or an identity number of the first communicating device, and a first radio frequency (RF) module configured to transmit a first message including at least one of the parking status, the size, the geographical coordinate of the first parking space or the identity number of the first communicating device via the first antenna in a wireless communication network.

Examples of the present invention may also provide an apparatus configured for parking management in a parking facility, the apparatus comprising a first antenna and a communicating device aboard a vehicle. The communicating device may further comprise a first radio frequency (RF) module configured to receive at least one message each including at least one of a parking status of a parking space in the parking facility, a size of the parking space, a geographical coordinate of the parking space related to a global positioning system (GPS) or an identity number of a communicating device corresponding to the parking space via the first antenna in a wireless communication network, a first memory configured to store at least one of the parking status, the size, the geographical coordinate of the parking space or an identity number of the first communicating device, and a first controller configured to identify at least one available parking space in the parking facility based on the at least one message.

Examples of the present invention may provide a method of managing a parking system in a parking facility, the parking system including a plurality of parking spaces and a plurality of sensor units each corresponding to one of the plurality of parking spaces and being configured for detecting a parking status of the corresponding one parking space and transmitting a message including the parking status in a wireless communicating network. The method includes detecting whether a vehicle parks at a parking space, detecting whether the vehicle includes an on-board communicating device when the parking space is occupied by the vehicle, if an on-board communicating device is detected, transferring a message from a sensor unit corresponding to the occupied parking space to the on-board communicating device, entering the sensor unit into a sleep mode, entering the on-board communicating device into an active mode in response to the message transferred from the sensor unit, detecting whether the vehicle leaves the parking space, and entering the sensor unit into the active mode if the vehicle leaves the parking space.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like parts.

Figure 1A:
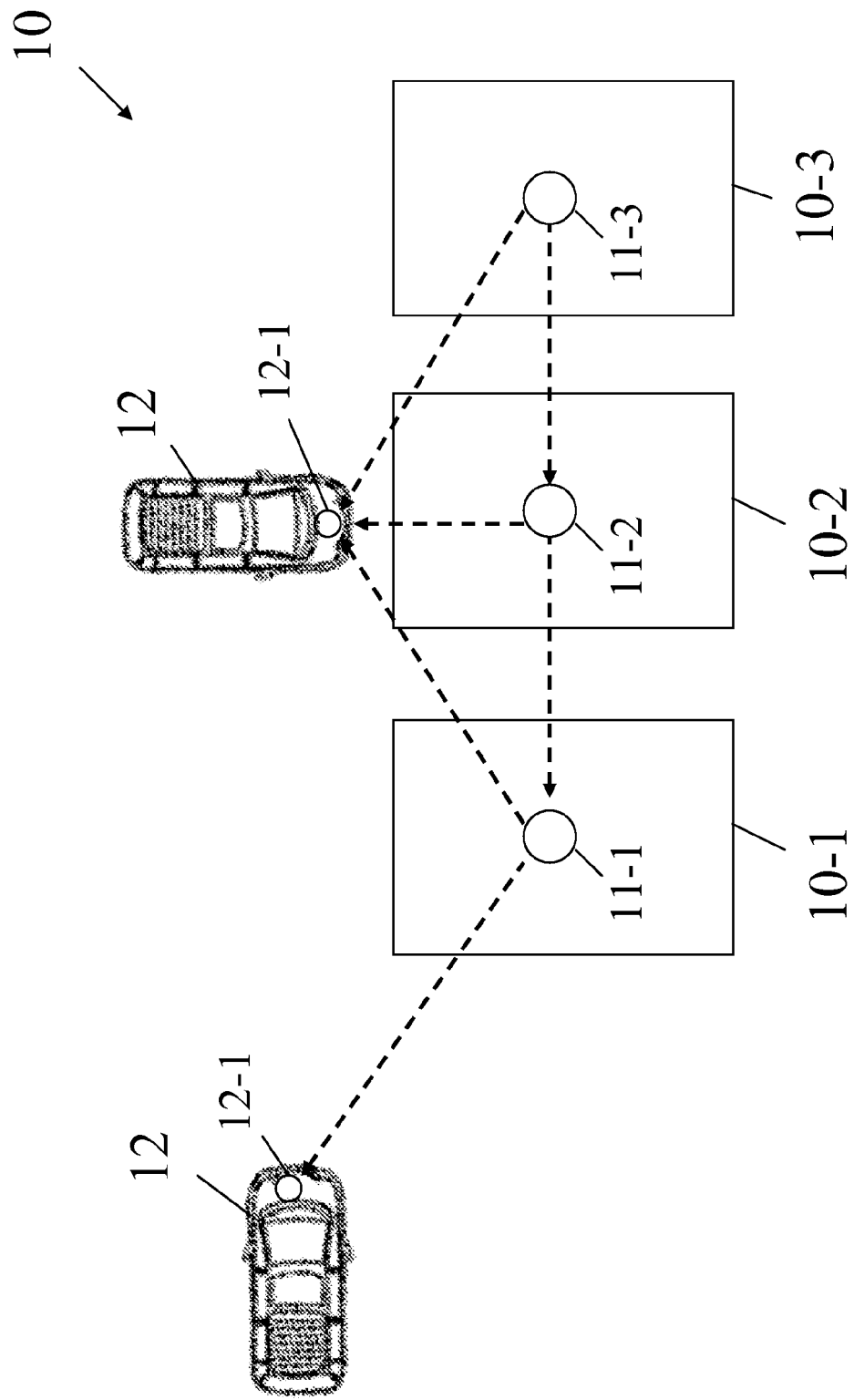
FIG. 1A is a schematic diagram of a system configured for parking management consistent with an example of the present invention.

FIG. 1A is a schematic diagram of a system 10 configured for parking management consistent with an example of the present invention. Referring to FIG. 1A, the system 10 may include a plurality of parking spaces 10-1, 10-2 and 10-3 and a plurality of sensor units 11-1, 11-2 and 11-3, which correspond to the parking spaces 10-1, 10-2 and 10-3, respectively. Each of the sensor units 11-1, 11-2 and 11-3 may be configured to detect a parking status such as occupancy or vacancy of a corresponding parking space, and transmit a message including the parking status in a wireless communication network. In one example consistent with the present invention, the sensor unit 11-3 may be configured to transmit a first message including a parking status of the parking space 10-3 to the sensor unit 11-2, as represented in an arrowhead, in a wireless network. Furthermore, the sensor unit 11-2 may be configured to transmit in the wireless network the first message from the sensor unit 11-3 to the sensor unit 11-1 and a second message including a parking status of the parking space 10-2 to the sensor unit 11-1, as represented in another arrowhead. The sensor unit 11-1, which may be located closer to an entrance of a parking facility than the sensor units 11-2 and 11-3, may be configured to collect the first message or the second message sent from the second sensor unit 11-2, and transmit in the wireless network the first message, the second message or a third message including a parking status of the parking space 10-1, as represented in yet another arrowhead, to a communicating device 12-1 aboard a vehicle 12. The sensor units 11-1, 11-2 and 11-3 and the communicating device 12-1 may each form a node in the wireless network.

For the purpose of simplicity, only three parking spaces 10-1, 10-2 and 10-3 and the corresponding sensor units 11-1, 11-2 and 11-3 are illustrated in the present example. In other examples, sensor units arranged in arrays may be distributed throughout a parking facility with respect to every parking space. The parking facility may be attached to or located near a building, which may include a residential, governmental, industrial, and commercial building such as, for example, a house, an apartment building, a retail store, a hospital, and/or an office building. Furthermore, the parking facility may include any well-known area and/or structure designated for the parking of vehicles such as, for example, a parking garage, an indoor parking area, an outdoor parking area, and a moving parking structure. The vehicles may include but are not limited to automobiles, trucks, tractors, mobile construction, agricultural equipment, and the like.

Figure 1B:
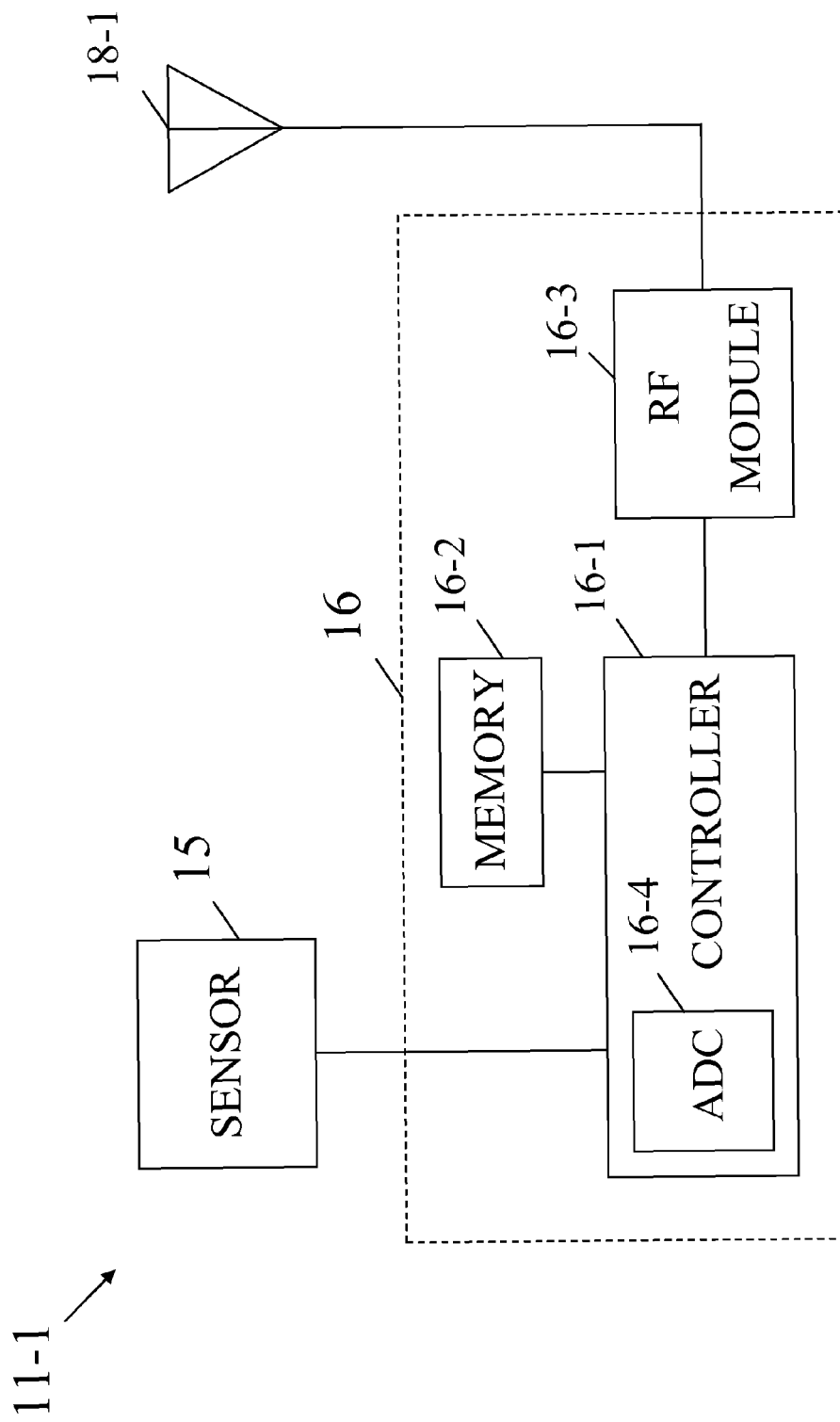
FIG. 1B is a schematic block diagram of a sensor unit illustrated in FIG. 1A consistent with an example of the present invention.

FIG. 1B is a schematic block diagram of the sensor unit 11-1 illustrated in FIG. 1A consistent with an example of the present invention. Referring to FIG. 1B, the sensor unit 11-1, which may be similar to the sensor units 11-2 and 11-3, includes a sensor 15, a communicating device 16 and an antenna 18-1. The sensor 15 may include one of an ultrasonic, mechanical, electrical, electromagnetic, inductive and optical device capable of detecting the parking status of a parking space. The sensor 15 may generate a signal, either analog or digital, in response to a change of the parking status. The communicating device 16 may further include a controller 16-1, a memory 16-2 and a radio-frequency (RF) module 16-3. The controller 16-1 may be configured to store the signal from the sensor 15 in the memory 16-2 such as a flash memory device, and transmit a message including the signal in a wireless network through the RF module 16-3 and the antenna 18-1. In one example, the controller 16-1 may further include an analog-to-digital converter (ADC) 16-4 to convert an analog signal sent from the sensor 15 into a digital one. The controller 16-1 may receive in the wireless network one or more message from one or more sensor unit such as the sensor unit 11-2, each of which may include a parking status and information of a corresponding one parking space. The controller 16-1 may also receive one or more message from one or more on-board communicating device such as the communicating device 12-1, each of which may include an identity of a vehicle equipped with a corresponding one on-board communicating device. The messages or signals that may be received via the antenna 18-1 and RF module 16-3 are processed by the controller 16-1, stored in the memory 16-2, and may be transmitted to other sensor units or on-board communicating devices once needed.

Referring again to FIG. 1A, the vehicle 12 may enter the radio range of the sensor unit 11-1 when appears at an entrance to the parking facility, which allows the sensor unit 11-1 to communicate with the communicating device 12-1 in the wireless network. When the vehicle 12 draws near the parking spaces 10-2 and 10-3, the sensor units 11-2 and 11-3 may then be able to communicate with the communicating device 12-1. In one example consistent with the present invention, the RF interface of the communicating device 16 may use a telecommunication technique that is able to support short-range wireless communications. Examples of the short-range telecommunications technique may include but are not limited to a ZigBee, infrared ("IR"), Bluetooth, UWB (Ultra Wide Band), WiMax (Worldwide Interoperability for Microwave Access), NFC (Near Field Communication) and optical beacon technology. ZigBee may refer to a published specification set of high level communication protocols designed to use small, low power digital radios for wireless personal area networks ("WPANs"). Bluetooth may refer to an industrial specification for wireless personal area networks ("PANs"), which provides a way to connect and exchange information between devices such as PDAs, cellular phones, laptops, personal computers ("PCs"), printers and digital cameras via a globally available short range radio frequency.

UWB may refer to a wireless communications technology that support transmission of data at a relatively high speed ranging from approximately 40 to 60 megabits per second and eventually up to 1 gigabit per second. WiMax may refer to a certification mark for products. Products that pass the WiMAX tests are capable of forming wireless connections between them to permit the carrying of internet packet data. The NFC Forum is a non-profit industry association formed to advance the use of NFC short-range wireless interaction in consumer electronics, mobile devices and PCs. The optical beacon may refer to a technique capable of carrying out two-way communication for providing information within a narrow or limited area.

Figure 1C:
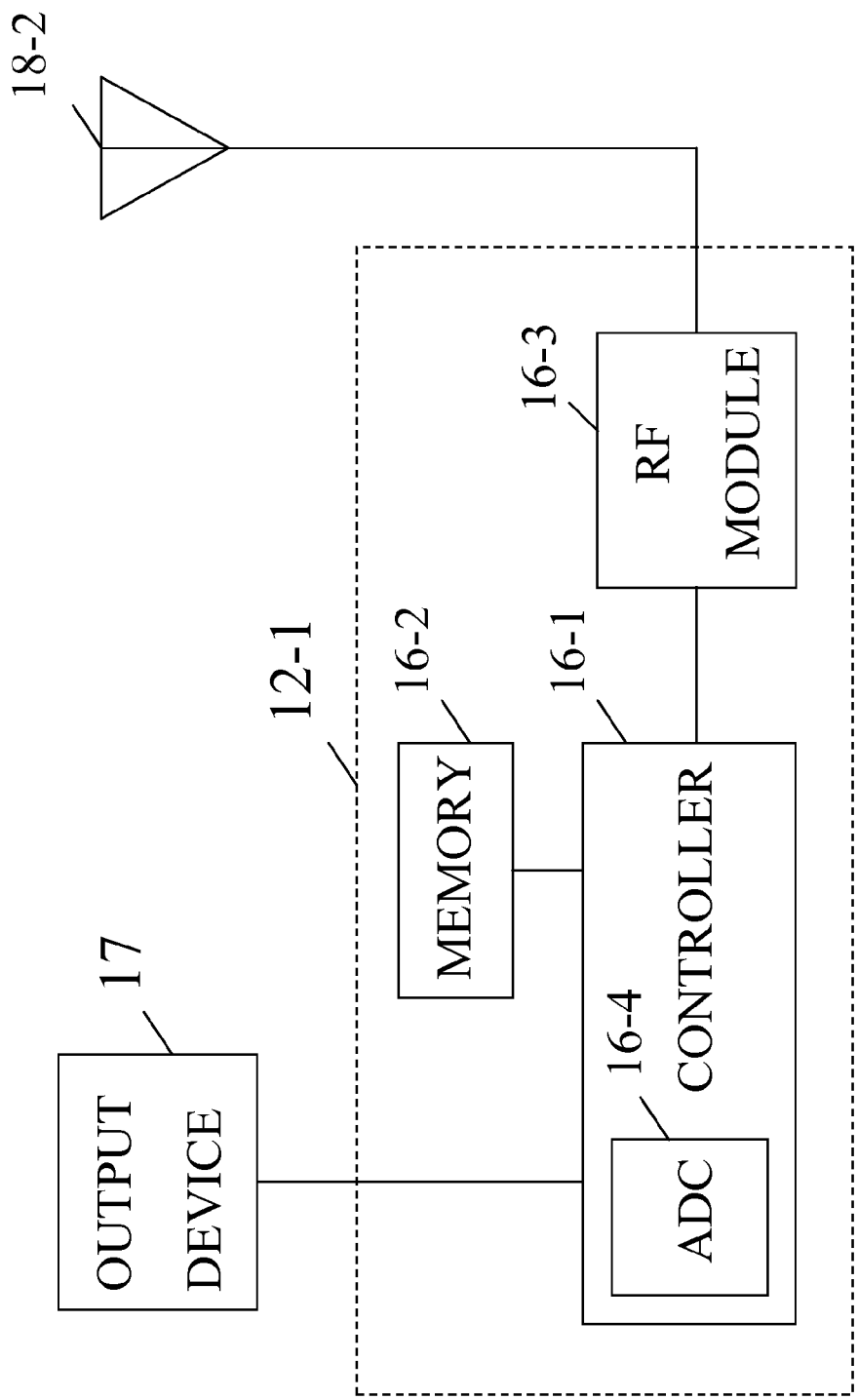
FIG. 1C is a schematic block diagram of a communicating device illustrated in FIG. 1A consistent with an example of the present invention.

FIG. 1C is a schematic block diagram of the communicating device 12-1 illustrated in FIG. 1A consistent with an example of the present invention. Referring to FIG. 1C, the communicating device 12-1 may be similar in structure to the communicating device 16 illustrated in FIG. 1B. The on-board communicating device 12-1 may include an identity number, which may distinguish the communicating device 12-1 from other communicating devices, and in turn distinguish a vehicle equipped with the on-board communicating device 12-1 from other vehicles. The identity number may be stored in the memory 16-2 and accessible to communicating devices of sensor units. The identity number may facilitate guiding traffic in a parking facility when one or more vehicle is each guided to an assigned parking space or an exit of the parking facility at substantially the same time. An output device 17 may be connected to the communicating device 12-1 to facilitate the guiding. The output device 17 may include a speaker that supports an audio guide, or a display that supports a video guide. In one example, the output device 17 may include electronic map function or web-on-the-map function to help guide the vehicle 12 to an available parking space or an exit of a parking facility.

Figure 2A:
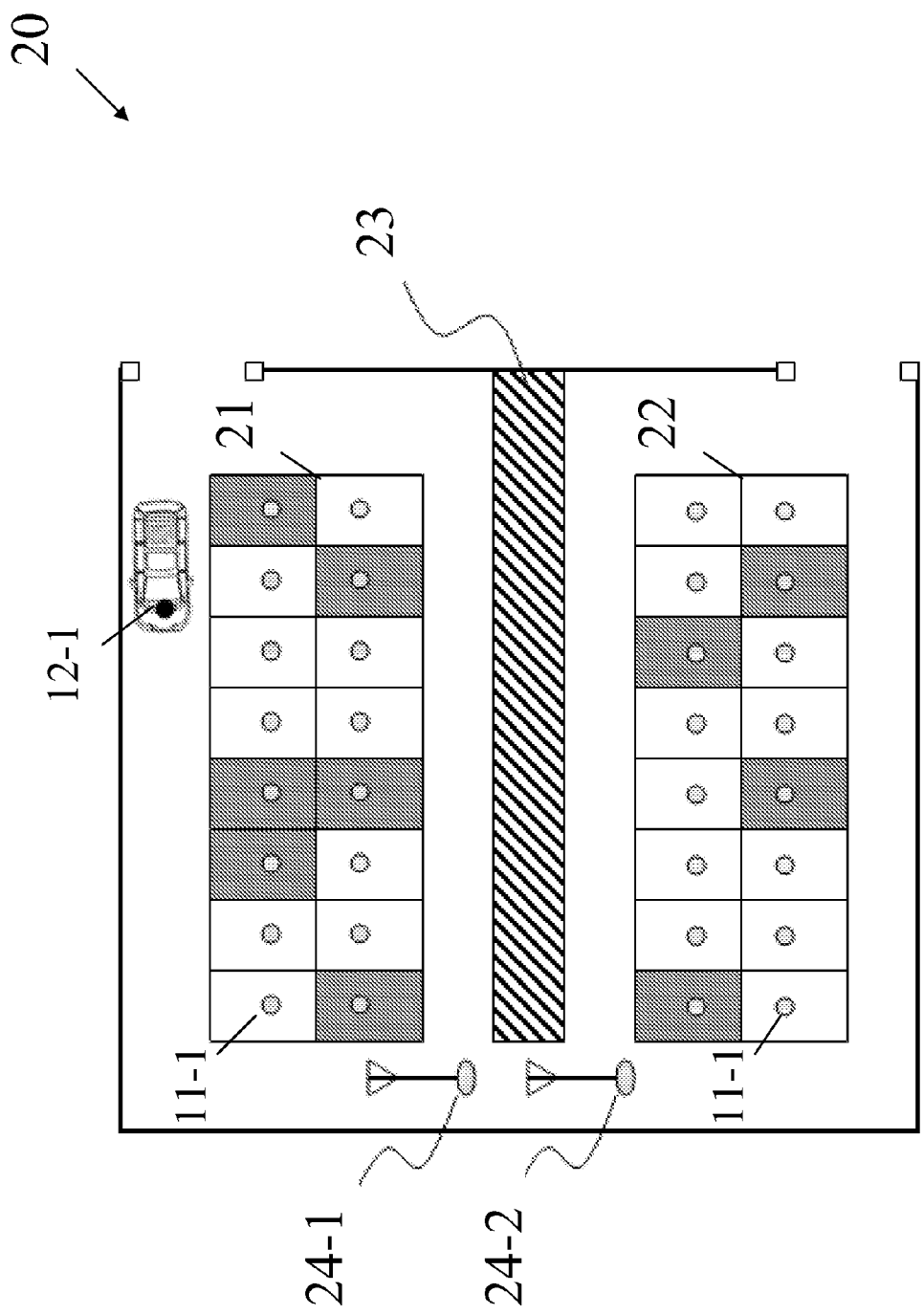
FIG. 2A is a schematic diagram of a system configured for parking management consistent with another example of the present invention.

FIG. 2A is a schematic diagram of a system 20 configured for parking management consistent with another example of the present invention. Referring to FIG. 2A, the system 20 may include a first array 21 of parking spaces and a second array 22 of parking spaces. Each of the parking spaces in the first array 21 and the second array 22 may include a sensor unit similar to, for example, the sensor unit 11-1 described and illustrated with reference to FIG. 1A. The first array 21 may be separated from the second array 22 by an impediment such as a wall, column or beam, which may interfere with the communications between sensor units in the first array 21 and the second array 22. To address the issue, a first gateway station 24-1 may be provided to collect parking information from the sensor units in the first array 21. Furthermore, a second gateway station 24-2 may be provided to collect parking information from the sensor units in the second array 22. Each of the first gateway station 24-1 and the second gateway station 24-2 may function to serve as a relay station and may further include a computer or a network that allows or controls access to another computer or network. In the present example, the first gateway station 24-1 may communicate with an on-board communicating device such as, for example, the communicating device 12-1 illustrated in FIG. 1A.

The first gateway station 24-1 and the second gateway station 24-2 may communicate with one another in a wired network or a wireless network. In the case of a wired network, digital subscriber line (DSL), cable or fiber technology may be used. DSL technology may refer to digital data transmission over the wires of a local telephone network. In the case of a wireless network, telecommunication techniques such as, for example, third-generation (3G or 3-G) technology, the global system for mobile communications (GSM) protocols, WiFi or WiMax may be used. The 3G technology may provide the ability to transfer simultaneously both voice data such as, for example, a telephone call and non-voice data such as, for example, downloading information, exchanging email and instant messages. The GSM protocols may refer to a standard for mobile phones, which may support international roaming between mobile phone operators and enables subscribers to use their phones in many parts of the world. WiFi may refer to a brand originally licensed by the Wi-Fi Alliance to describe the underlying technology of wireless local area networks (WLANs) based on the IEEE 802.11 specifications, and may support mobile computing devices, such as laptops, in LANs, Internet and voice over Internet Protocol (VoIP) phone access and basic connectivity of consumer electronics such as televisions and DVD players, or digital cameras. A person with a Wi-Fi enabled device such as a computer, cell phone or personal digital assistant (PDA) may connect to the Internet in proximity of an access node.

Figure 2B:
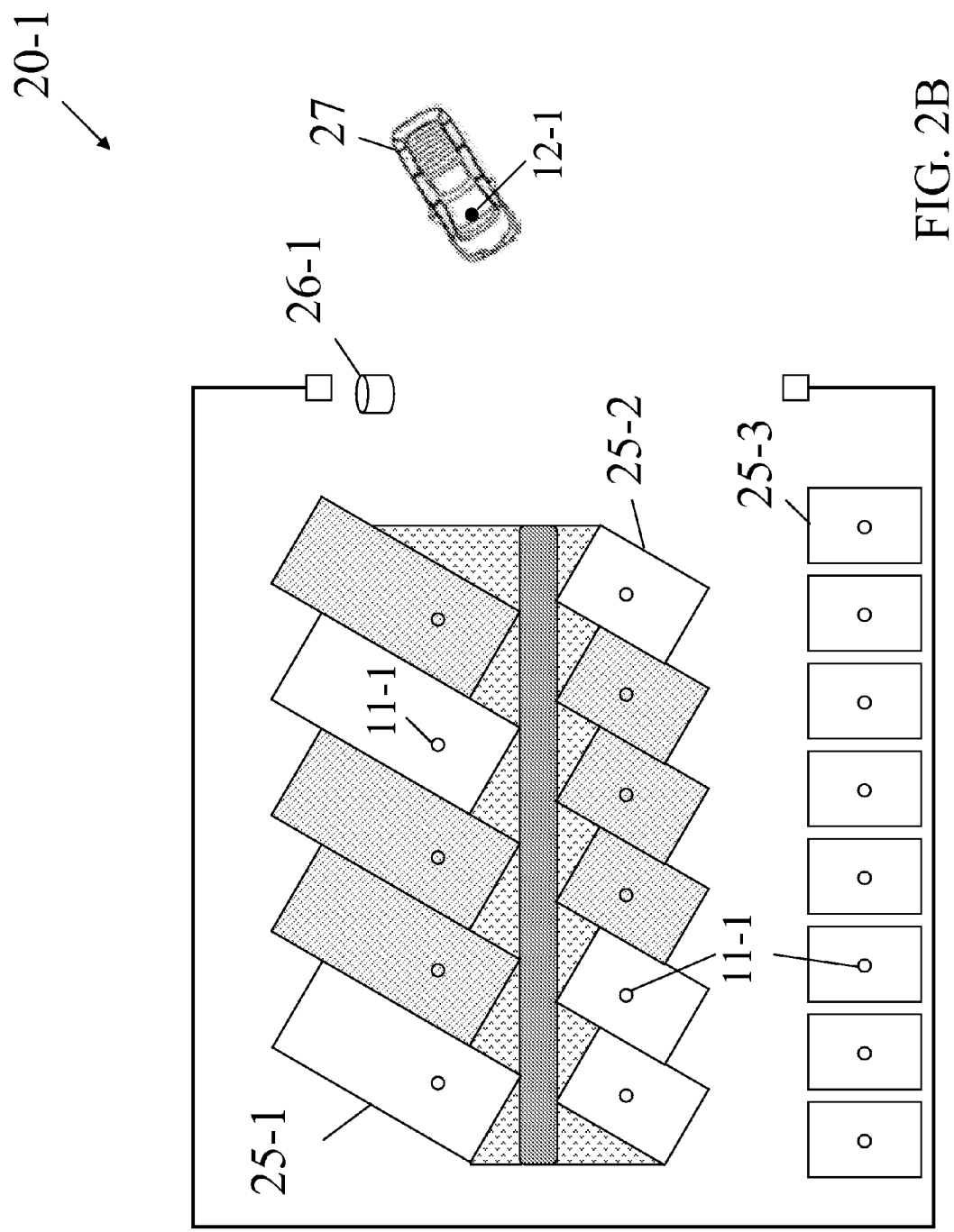
FIG. 2B is a schematic diagram of a system configured for parking management consistent with still another example of the present invention.

FIG. 2B is a schematic diagram of a system 20-1 configured for parking management consistent with still another example of the present invention. Referring to FIG. 2B, the system 20-1 may include a gateway device 26-1 and a plurality of parking spaces 25-1, 25-2 and 25-3 each having a corresponding sensor unit 11-1. The parking spaces 25-1, 25-2 and 25-3 are configured for different sizes of vehicles. Specifically, the parking spaces 25-1 may be configured for the parking of relatively large-sized vehicles such as buses, trucks and trailers. The parking spaces 25-2 may be configured for the parking of relatively medium-sized vehicles like recreation vehicles (RVs). The parking spaces 25-3 may be configured for the parking of relatively small-sized vehicles like compact cars. The parking information of each of the parking spaces 25-1 to 25-3, including the space size, may be collected at the gateway device 26-1 and may facilitate the gateway device 26-1 to guide a vehicle 27 to an available parking space of its size. In one example, the on-board communicating device 12-1 may further include information of vehicle size, which facilitates the gateway device 26-1 to identify an optimal parking space.

Figure 3A:
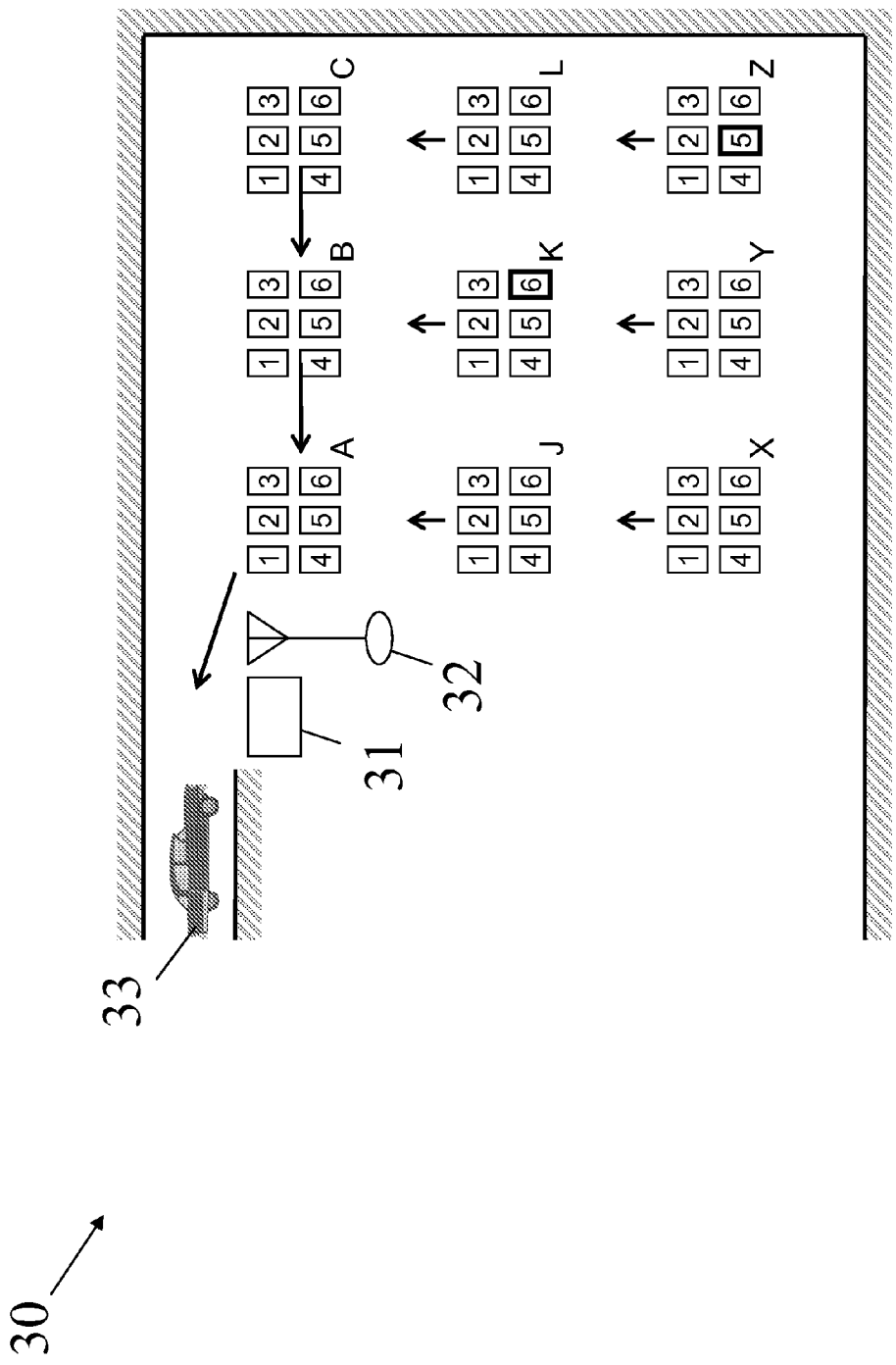
FIGS. 3A to 3C are schematic diagrams of a system configured for parking management consistent with still another example of the present invention.
Figure 3B:
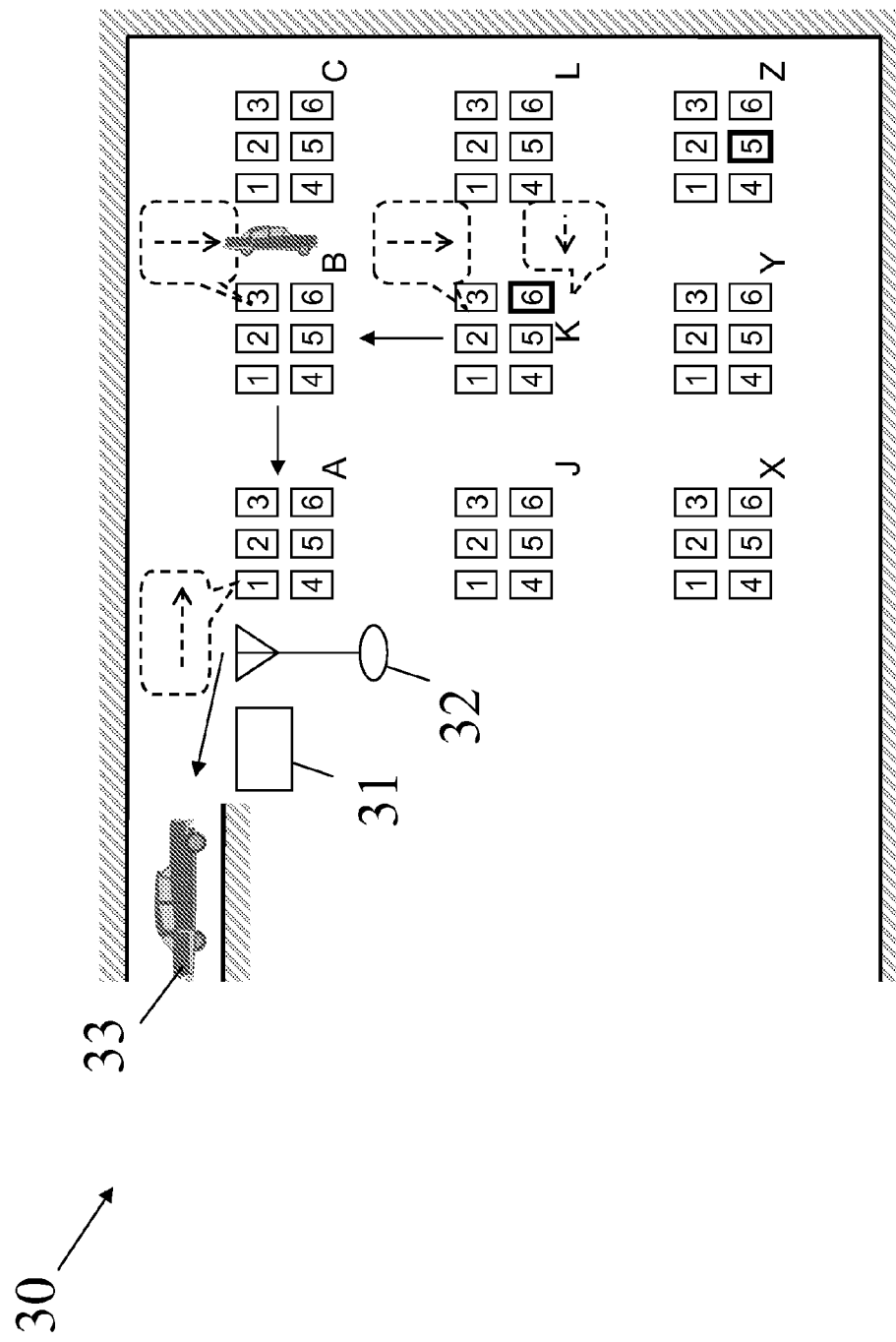
Figure 3C:
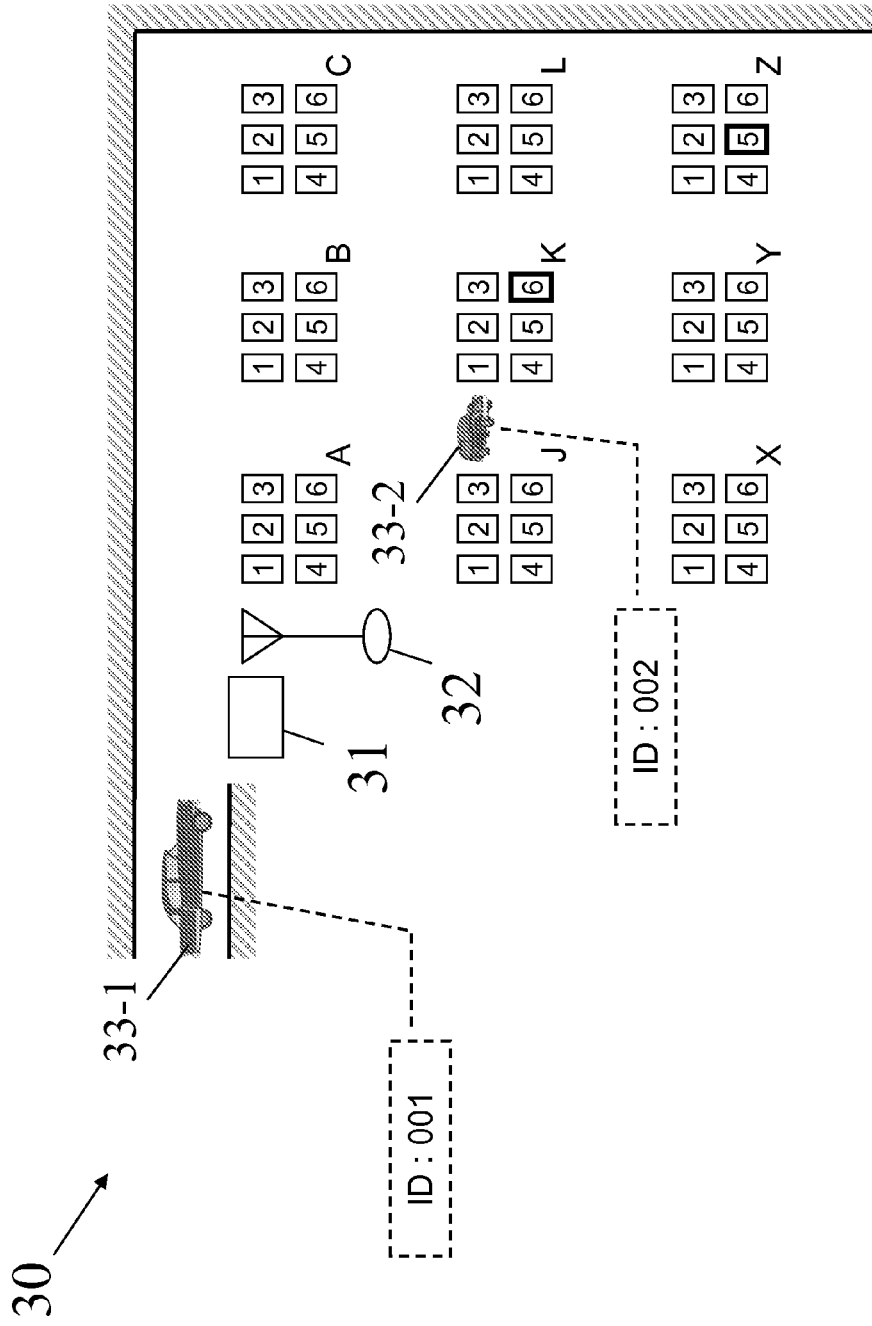

FIGS. 3A to 3C are schematic diagrams of a system 30 configured for parking management consistent with an example of the present invention. Referring to FIG. 3A, the system 30 may include a plurality of parking spaces distributed in regions A, B, C, J, K, L, X, Y and Z, where the region A is the closest region and the region Z is the most remote region with respect to a gate 31, which may include an entrance, an exit or both. Each of the parking spaces may include a sensor unit similar to the sensor unit 11-1 illustrated in FIG. 1A. The number of regions of the system 30 may depend on the transmission range of the sensor unit such that signals or messages may be transmitted from one region to an immediately adjacent region in one hop. For example, messages from the region Y may reach the regions X, K and Z. In an example consistent with the present invention, a region disposed downstream another region relative to the gate 31 as a destination may be configured to receive messages from the upstream region. For example, the region L, disposed downstream the region Z, may be configured to receive messages sent from the region Z, as represented in an arrowhead. In another example, the messages from the upstream region Z may be received by the downstream region Y. Likewise, the region C, disposed downstream the region L relative to the gate 31, may be configured to receive messages sent from the region L. Consequently, the most downstream region, i.e., the region A, may collect messages from the other regions in the system 30, and transmit the messages, which include the parking information of, for example, available parking spaces, to an on-board communicating device similar to the communicating device 12-1 as illustrated in FIG. 1A of a vehicle 33 at the gate 31. In another example, a gateway station 32 may be provided to collect messages sent from the regions A, B, C, J, K, L, X, Y and Z.

In the present example, messages from a remote region (for example, the region Z) are transmitted downstream along a column of the array of parking spaces to the most downstream-column region (the region C) on the same column as the remote region Z, and then transmitted downstream along a row to an entrance region (the region A) or a gateway station. Accordingly, a message from the region Z may be transmitted to the region A or the gateway station 32 via regions L and C in a column direction and then regions B and A in a row direction. In another example, however, messages from a remote region (for example, the region Z) are transmitted along a row of the array of parking spaces to the most downstream-row region (the region X) on the same row as the remote region Z, and then transmitted along a column to an entrance region (the region A) or a gateway station. Accordingly, a message from the region Z may be transmitted to the region A or the gateway station 32 via regions Y and X in a row direction and then regions J and A in a column direction. The rule to allow one downstream region to receive message from an upstream region as described above may facilitate determining an optimal route from the gate 31 to an available parking space.

In one example consistent with the present invention, a message from an available parking space may include a parking space identity and a counter. When the message is transmitted among sensor units of a same region, the count value remains the same. When the message is transmitted from one region to another, the count value increases. In one example, the count value may increase as many as the hops from one region to another. Assuming that the parking spaces Z5 and K6 (shown in bolded boxes) are available parking spaces, the sensor unit corresponding to the parking space Z5 may generate a message including the identity "Z5" and an initial count "0", denoted as (Z5, 0). As the message is received by the region L, the count value increases by one, resulting in new parking information (Z5, 1). The message will reach the vehicle 33 after five hops. Accordingly, parking information (Z5, 5) may be received by the on-board communicating device, which means that the parking space Z5 is available and the distance is "5" (hops). Additional parking information (K6, 3) may also be received by the on-board communicating device. Since the parking space K6 is closer than Z5, the on-board communicating device may identify that the parking space K6 is an optimal parking space. In one example consistent with the present invention, the sensor unit corresponding to the parking space A1 may be configured to collect the parking information and identify an optimal parking space for an incoming vehicle. In another example, the gateway station 32 may be configured to collect the parking information and identify an optimal parking space for an incoming vehicle.

Once the optimal parking space is identified, referring to FIG. 3B, a driver on the vehicle 33 may be guided to the parking space K6 by an output device such as the output device 17 as illustrated in FIG. 1C. In one example, the way from an entrance to an available parking space may be substantially contrary in direction to the route a parking message sent from the available parking space to a vehicle at the entrance.

In one example consistent with the present invention, each on-board communicating device may have an identity number that distinguishes the on-board communicating device from the others, and in turn distinguishes a vehicle equipped with the on-board communicating device from the other vehicles. Referring to FIG. 3C, when more than one vehicles 33-1 and 33-2 appear at a parking facility, the system 30 may retrieve the identity numbers of on-board communicating devices and guide the vehicle 33-1 and 33-2 each to an available parking space in accordance with the identity numbers. For example, the vehicle 33-1 with a first ID "0001" may be directed to the parking space "Z5" and the vehicle 33-2 with a second ID "0002" may be directed to the parking space "K6".

Figure 4A:
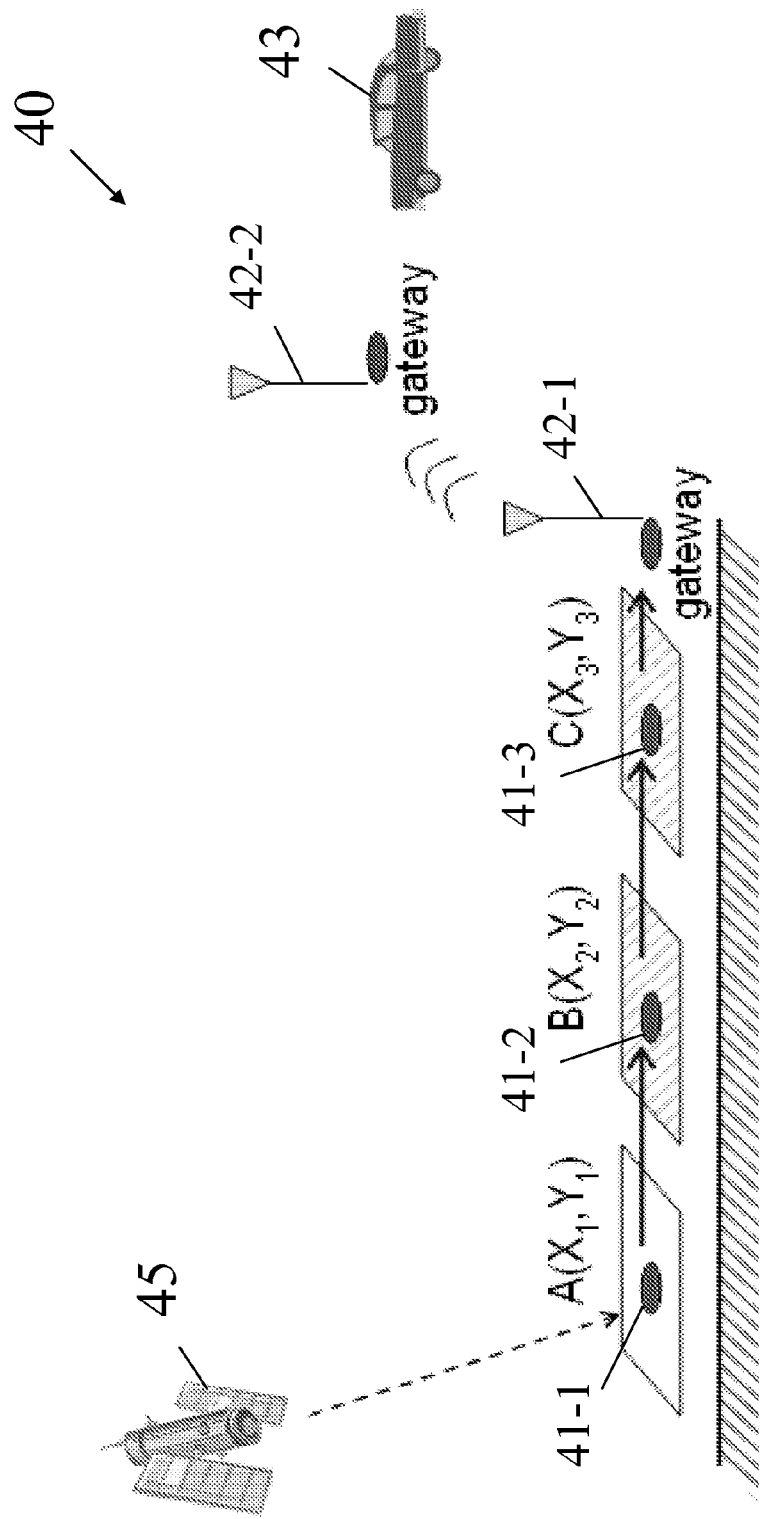
FIGS. 4A and 4B are schematic diagrams of a system configured for parking management consistent with yet another example of the present invention.
Figure 4B:
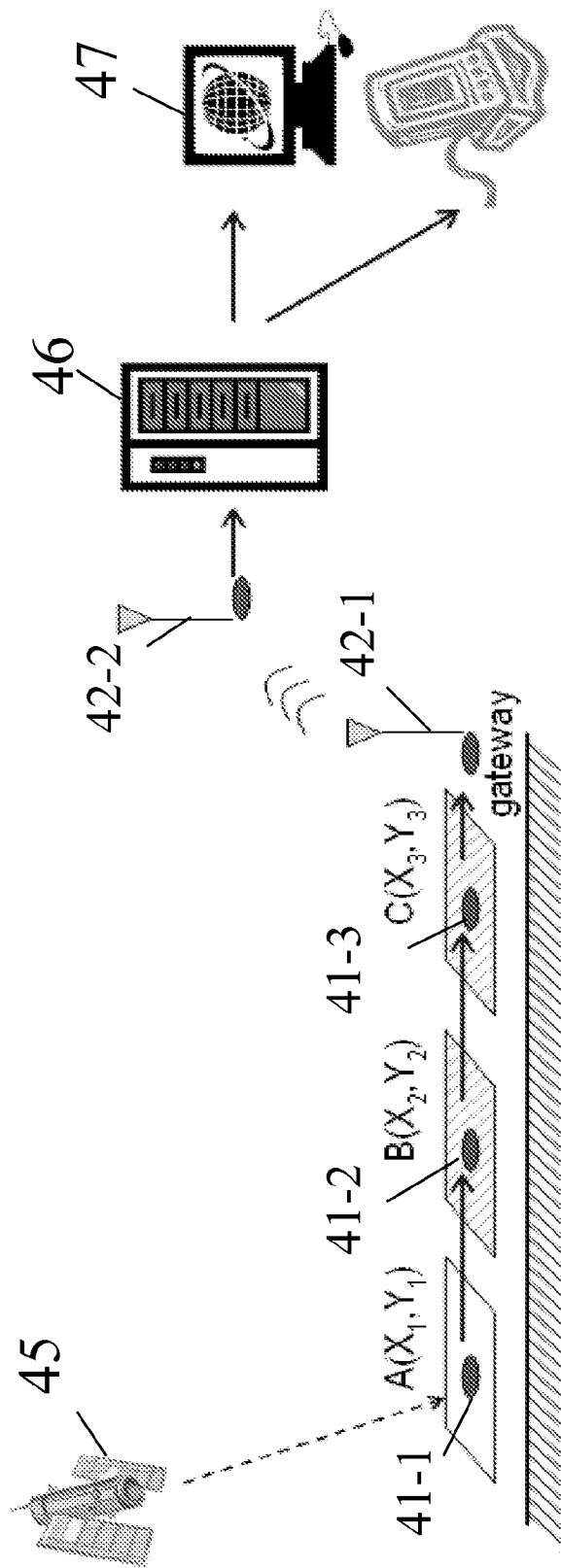

FIGS. 4A and 4B are schematic diagrams of a system 40 configured for parking management consistent with yet another example of the present invention. Referring to FIG. 4A, the system 40 may include a plurality of parking spaces A, B and C and sensor units 41-1, 41-2 and 41-3 corresponding to the parking spaces A, B and C, respectively. Each of the sensor units 41-1, 41-2 and 41-3 may further include a global positioning system (GPS) receiver to communicate with a GPS satellite 45. The GPS may refer to a satellite navigation system, where GPS satellites broadcasts precise timing signals by radio, allowing a GPS receiver to actually determine its location regarding longitude, latitude and altitude on the earth. In the present example, the location of the parking spaces A, B and C are represented as $(X_1, Y_1)$, $(X_2, Y_2)$ and $(X_3, Y_3)$, respectively. The parking information including the geographical coordinates of the parking spaces A, B and C may be transmitted to gateway stations 42-1 and 42-2 and therefore may be accessible to a vehicle 43 having a GPS receiver through a nearby gateway station, for example, the gateway station 42-2.

In another example, the sensor units 41-1, 41-2 and 41-3 may store the geographical coordinates of the parking spaces A, B and C, respectively, and transmit the parking information together with the geographical coordinates to the gateway stations 42-1 and 42-2, thereby eliminating the GPS receiver in each of the sensor units 41-1, 41-2 and 41-3.

Referring to FIG. 4B, the parking information including the geographical coordinates of the parking spaces A, B and C may be transmitted to the gateway stations 42-1 and 42-2 and a web server 46, and therefore may be accessible to a device 47 capable on Internet connectivity, such as a notebook computer, a PDA and a cell phone.

Figure 5:
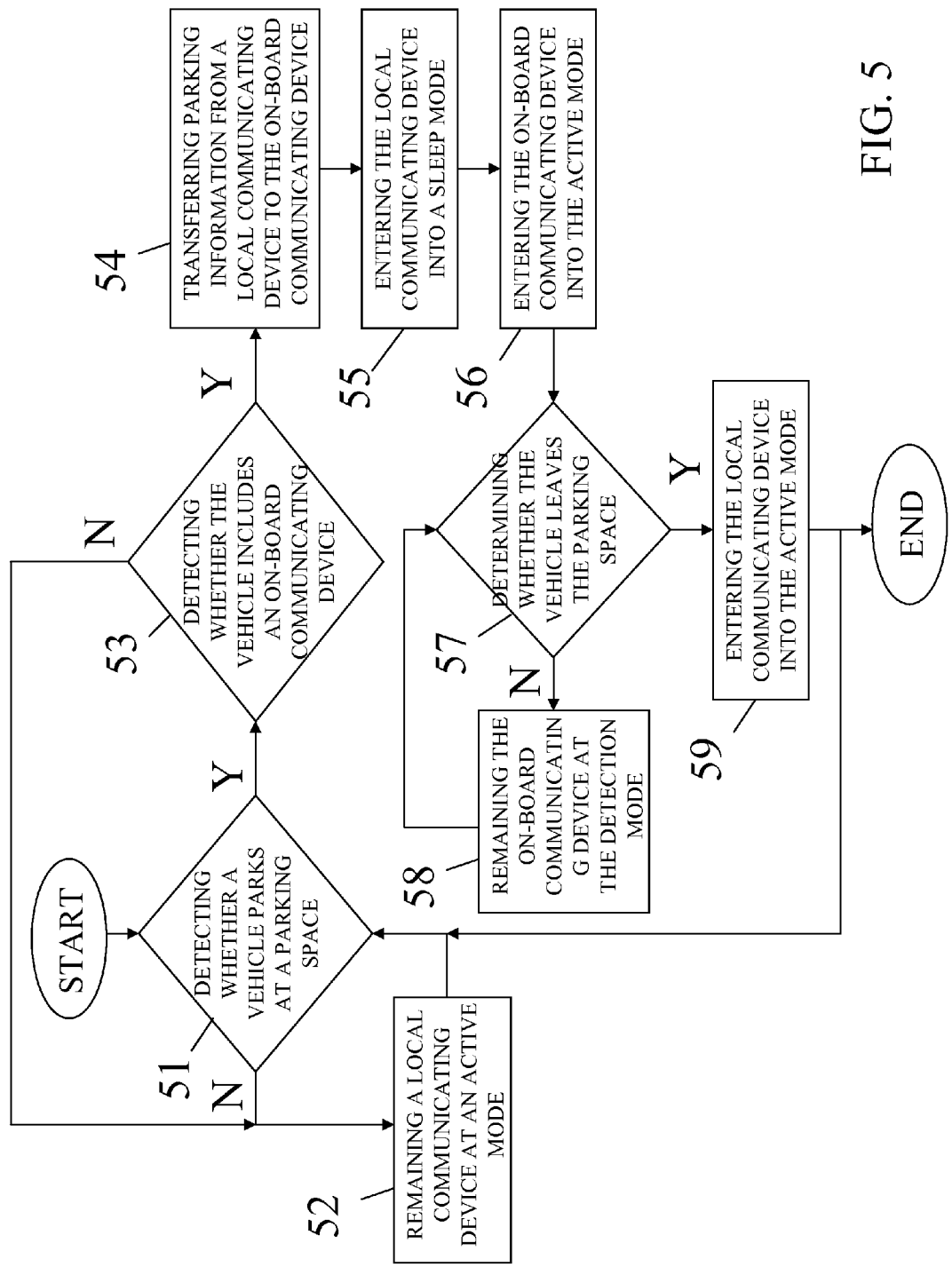
FIG. 5 is a flow diagram illustrating a method of parking management consistent with an example of the present invention.

FIG. 5 is a flow diagram illustrating a method of parking management consistent with an example of the present invention. Referring to FIG. 5, at step 51, a sensor of a sensor unit may detect whether a parking space corresponding to the sensor unit is occupied by a vehicle. If not, at step 52, a local communicating device of the sensor unit may remain at an active mode, at which the local communicating device performs, for example, a networking function to transmit messages in a wireless network, and/or a guiding function to direct a vehicle to an available parking space by, for example, keeping or updating a count value. If confirmative, at step 53, the local communicating device detects whether the vehicle includes an on-board communicating device. If not, the local communicating device remains at the active mode to support the networking function and the guiding function. If confirmative, at step 54, the local communicating device may transfer current parking information to the on-board communicating device of the vehicle, and store a copy of the parking information in a memory device thereof to prevent an unexpected failure of the on-board communicating device, which may result in a loss of the parking information. The parking information may include an identity of the local communicating device, which may correspond to a parking space of a parking facility and may represent a node in a wireless network. The parking information may further include network parameters such as frequency and power required to perform the networking function, and system parameters such as time intervals required to respond to a node failure check. The parking information may also include vehicle guidance information regarding a path between an entrance gate and a parking space, and traffic restriction information that requires a node to transmit messages to or receive messages from a predetermined region of parking spaces in a parking facility.

Next, after the parking information is transferred, at step 55, the local communicating device may enter a sleep mode, which saves power consumption of the local communicating device. At step 56, in response to the parking information transferred from the local communicating device, the on-board communicating device may enter the active mode and provide the networking and guiding functions of the local communicating device. The on-board communicating device may identify at step 57 whether the vehicle leaves the parking space. If not, at step 58, the on-board communicating device remains at the active state and the local communicating device remains at the sleep mode. If confirmative, at step 59, the on-board communicating device may generate a signal to wake up the local communicating device and transfer the most updated parking information to the local communicating device, which in turn may change from the sleep mode to the active mode to resume its networking and guiding functions.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A system for parking management in a parking facility, the system comprising a sensor unit, the sensor unit including:
    a sensor configured to detect a parking status of a first parking space; and
    a first communicating device configured to transmit a first status message, wherein the first status message includes the parking status of the first parking space, and a counter value indicative of a number of regions of parking spaces through which the first status message is transmitted.

2. The system of claim 1, wherein the counter value remains the same when the first status message is transmitted through parking spaces of one region.

3. The system of claim 1, wherein the first communicating device is associated with the first parking space and is configured to transmit the first status message to a second communicating device associated with a second parking space, and wherein when the second parking space is nearer than the first parking space to an entrance of the parking facility, the first communicating device is configured to ignore or be prohibited from receiving a second status message transmitted from the second communicating device.

4. The system of claim 1, wherein the first communicating device is associated with the first parking space and is configured to collect a plurality of status messages including the first status message and one or more other status messages transmitted from one or more other communicating devices that are associated with one or more other parking spaces, wherein the first and one or more other parking spaces are at different distances to an entrance of the parking facility, and wherein the first communicating device is configured to identify an optimal parking space for a coming vehicle based on the collected status messages.

5. The system of claim 1, wherein the first communicating device is configured to operate in an active mode when the first parking space is available.

6. The system of claim 1, wherein the first communicating device is configured to operate in an active mode in response to detecting a presence of a vehicle in the first parking space.

7. The system of claim 1, wherein the first communicating device is configured to transmit parking information to a mobile communicating device associated with a vehicle parked in the first parking space.

8. The system of claim 7, wherein the first communicating device is configured to activate the mobile communicating device, including being configured to transmit the parking information to the mobile communicating device, and wherein the first communicating device is configured to enter a sleep mode upon the transmission of the parking information.

9. The system of claim 8, wherein the first communicating device is configured to enter an active mode upon receipt of updated parking information from the mobile communicating device.

10. An apparatus for parking management in a parking facility, the apparatus comprising a first communicating device associated with a first parking space, the first communicating device being configured to:
    transmit a first status message, wherein the first status message includes a parking status of the first parking space, and a counter value indicative of a number of regions of parking spaces through which the status message is transmitted;
    transmit parking information to a mobile communicating device, the mobile communicating device entering an active mode in response to the parking information; and
    enter a sleep mode upon transmission of the parking information.

11. The apparatus of claim 10, wherein the first communicating device is configured to enter an active mode upon receipt of updated parking information from the mobile communicating device.

12. The apparatus of claim 10, wherein the first communicating device is configured to transmit the first status message to a plurality of mobile communicating devices associated with a respective plurality of vehicles, and wherein the first communicating device is configured to retrieve identity numbers of the plurality of the mobile communicating devices and guide the plurality of vehicles to available parking spaces in accordance with the identity numbers.

13. The apparatus of claim 10, wherein the counter value remains the same when the first status message is transmitted through parking spaces of one region.

14. The apparatus of claim 10, wherein the first communicating device is configured to transmit the first status message to a second communicating device associated with a second parking space, and wherein when the second parking space is nearer than the first parking space to an entrance of the parking facility, the first communicating device is configured to ignore or be prohibited from receiving a second status message transmitted from the second communicating device.

15. The apparatus of claim 10, wherein the first communicating device is configured to collect a plurality of status messages including the first status message and one or more other status messages transmitted from one or more other communicating devices that are associated with one or more other parking spaces, wherein the first and one or more other parking spaces are at different distances to an entrance of the parking facility, and wherein the first communicating device is configured to identify an optimal parking space for a coming vehicle based on the collected status messages.

16. The apparatus of claim 10 further comprising a sensor configured to detect a parking status of the first parking space, wherein the first communicating device is configured to operate in an active mode when the first parking space is available.

17. The apparatus of claim 10, wherein the first communicating device is configured to operate in an active mode in response to detecting a presence of the vehicle in the first parking space.

18. An apparatus for parking management, the apparatus comprising a mobile communicating device, the mobile communicating device being configured to:

receive a first message from a parking communicating device, wherein the first message includes a parking status of the parking space and a counter value indicative of a number of regions of parking spaces through which the first message is transmitted; and identify an optimal parking space based on the counter value.

19. The apparatus of claim 18, wherein the mobile communicating device is associated with a vehicle and is configured to receive a second message from the parking communicating device, the second massage including parking information, the parking information including at least of one of network parameters, system parameters, vehicle guidance information or traffic restriction information.

20. The apparatus of claim 19, wherein the mobile communicating device is configured to enter an active mode upon the receipt of the second message.

21. The apparatus of claim 20, wherein the mobile communicating device is configured to enable the parking communicating device to enter a sleep mode upon the receipt of the second message.

22. The apparatus of claim 21, wherein the mobile communicating device is configured to transmit updated parking information to the parking communicating device to activate the parking communicating device.

23. The apparatus of claim 18 further comprising an output device to guide the vehicle to the parking device upon receipt of the first message.

* * * * *